United States Patent
Nguyen et al.

(10) Patent No.: US 7,122,916 B2
(45) Date of Patent: Oct. 17, 2006

(54) MULTI-UNIT POWER GENERATION SYSTEM FOR STAND-ALONE AND GRID CONNECTED OPERATION

(75) Inventors: Cuong Van Nguyen, Redondo Beach, CA (US); Daniel W. Trimble, Los Angeles, CA (US)

(73) Assignee: General Electric Company, Schenectady, NY (US)

( * ) Notice: Subject to any disclaimer, the term of this patent is extended or adjusted under 35 U.S.C. 154(b) by 483 days.

(21) Appl. No.: 10/248,410

(22) Filed: Jan. 16, 2003

(65) Prior Publication Data

US 2004/0140674 A1   Jul. 22, 2004

(51) Int. Cl.
   *H02J 3/04* (2006.01)
(52) U.S. Cl. .......................... 307/57; 307/68
(58) Field of Classification Search ............ 307/68, 307/57

See application file for complete search history.

(56) References Cited

U.S. PATENT DOCUMENTS

| | | | | |
|---|---|---|---|---|
| 3,974,397 A | * | 8/1976 | Killough, Jr. ............... | 307/82 |
| 4,256,972 A | * | 3/1981 | Wyatt et al. ................ | 307/68 |
| 4,874,961 A | * | 10/1989 | Henderson .................. | 307/87 |
| 6,158,207 A | | 12/2000 | Polenick et al. ............ | 60/39.02 |
| 6,169,334 B1 | * | 1/2001 | Edelman ...................... | 290/52 |
| 6,194,794 B1 | | 2/2001 | Lampe et al. ................ | 307/68 |
| 6,297,977 B1 | | 10/2001 | Huggett et al. .............. | 363/65 |
| 6,849,967 B1 | * | 2/2005 | Lathrop et al. .............. | 307/64 |
| 2003/0062775 A1 | * | 4/2003 | Sinha .......................... | 307/68 |
| 2004/0046458 A1 | * | 3/2004 | MacKay ....................... | 307/80 |

OTHER PUBLICATIONS

"MultiPac Option," Mar. 2000, 1 page (www.capstoneturbine.com).
"MultiPac Installation Instructions," undated, 1 page (www.capstoneturbine.com).
"Stand Alone Option," Oct. 5, 1999, 1 page (www.capstoneturbine.com).

* cited by examiner

*Primary Examiner*—Brian Sircus
*Assistant Examiner*—Daniel Cavallari
(74) *Attorney, Agent, or Firm*—Sutherland Asbill & Brennan LLP

(57) ABSTRACT

A multi-unit power generation system comprising a plurality of generators connected in parallel, a switching system for switching between and/or aggregating a generator load produced by the plurality of generators and a utility grid load, and a control system. The control system is in communication with each generator for communicating command signals to each generator. The control system is further in communication with the switching system for commanding the switching system to switch between or aggregate the generator load and the utility grid load. Each generator may comprise, for example, a microturbine generator.

15 Claims, 2 Drawing Sheets

MULTI-UNIT POWER GENERATION SYSTEM FOR STAND-ALONE AND GRID CONNECTED OPERATION

BACKGROUND OF INVENTION

Technical Field

The present invention relates to distributed power generating systems. More specifically, the present invention relates to parallel operation and control of multiple electrical power generators to provide grid-connected and/or stand-alone power generation.

Microturbine generators are used as distributed power generation systems to generate on-site power at locations such as businesses, homes, or other facilities. Microturbines can be connected to a power grid or run in stand-alone mode. In addition, multiple microturbines may be connected in parallel in order to combine their outputs. In any such application, multiple microturbines can be controlled and operated to provide total power (load following) or partial power (peak shaving or base loading). However, systems involving multiple microturbines connected in parallel present significant design challenges that have yet to be satisfactorily overcome.

In particular multiple microturbine systems of the prior art are generally unable to insure safe, reliable and economical operation while also providing the user with a high power quality level. Such prior art systems tend to have low system tolerance to external faults and transients. Such prior art systems are typically not able to match site voltage levels with standard generators, as well as isolate loads and grid utility systems from the possibility of coupling direct current conditions from unbalanced or faulty inverters. In addition, start-up of prior art multiple microturbine systems is costly, typically involving multiple batteries or the need to acquire power from the utility grid.

To overcome the above-described and other design challenges is a satisfactory and economical manner, a system to function a number of microturbines in a similar fashion that a single microturbine operates is required.

SUMMARY OF INVENTION

A multi-unit power generation system comprising a plurality of generators; connected in parallel, a switching system for switching between and/or aggregating a generator load produced by the plurality of generators and a utility grid load, and a control system. The control system is in communication with each generator for communicating command signals to each generator. The control system is further in communication with the switching system for commanding the switching system to switch between or aggregate the generator load and the utility grid load. Each generator may comprise, for example, a microturbine generator.

Each generator is connected to a corresponding output isolation transformer to convert a generator output voltage to a site operating voltage. The switching system includes a power meter to monitor the generator load and a feedback signal is provided by the switching system to the control system to inform the control system of the generator load. The switching system may also contain means for measuring load conditions and utility grid conditions. Feedback signals may be provided by the switching system to the control system to inform the control system of the load conditions and utility grid conditions.

The switching system comprises a utility circuit breaker and a generator circuit breaker. The switching system communicates position information for the utility circuit breaker and the generator circuit breaker to the control system. The control system commands the switching system to open and close the utility circuit breaker and the generator circuit breaker in order to switch between or aggregate the generator load and the utility grid load.

The control system may further receive input signals from one or more input devices for allowing an operator to control the generator load. The control system may be programmed to controls the generators to provide programmable scheduled start/stop times, load profiles, load following offset and peak shaving power levels. In operation of the system, the control system designates a first generator as a master generator and all other generators as slave generators. The control system commands the master generator to operate at the normal utility frequency, which is in synchronization with the utility frequency when it is present. The master generator communicates a synchronization signal indicating said frequency to the slave generators.

These and other aspects, features and advantages of the present invention will become apparent upon a reading of the following description of certain exemplary embodiments and with reference to the accompanying drawings.

DETAILED DESCRIPTION

The present invention provides a multi-unit power generation system. The multi-unit power generation system comprises multiple power generators, such as microturbines, connected and working in parallel. A control system is provided for operating the multiple power generators as if they were a single unit and for maximizing the overall efficiency of the system. A switching system is provided for switching between a stand-alone power generation mode and a grid-connected power generation mode. Exemplary embodiments of the invention will hereinafter be described with reference to the figures, in which like numeral indicate like elements throughout the several drawings.

Figure 1:
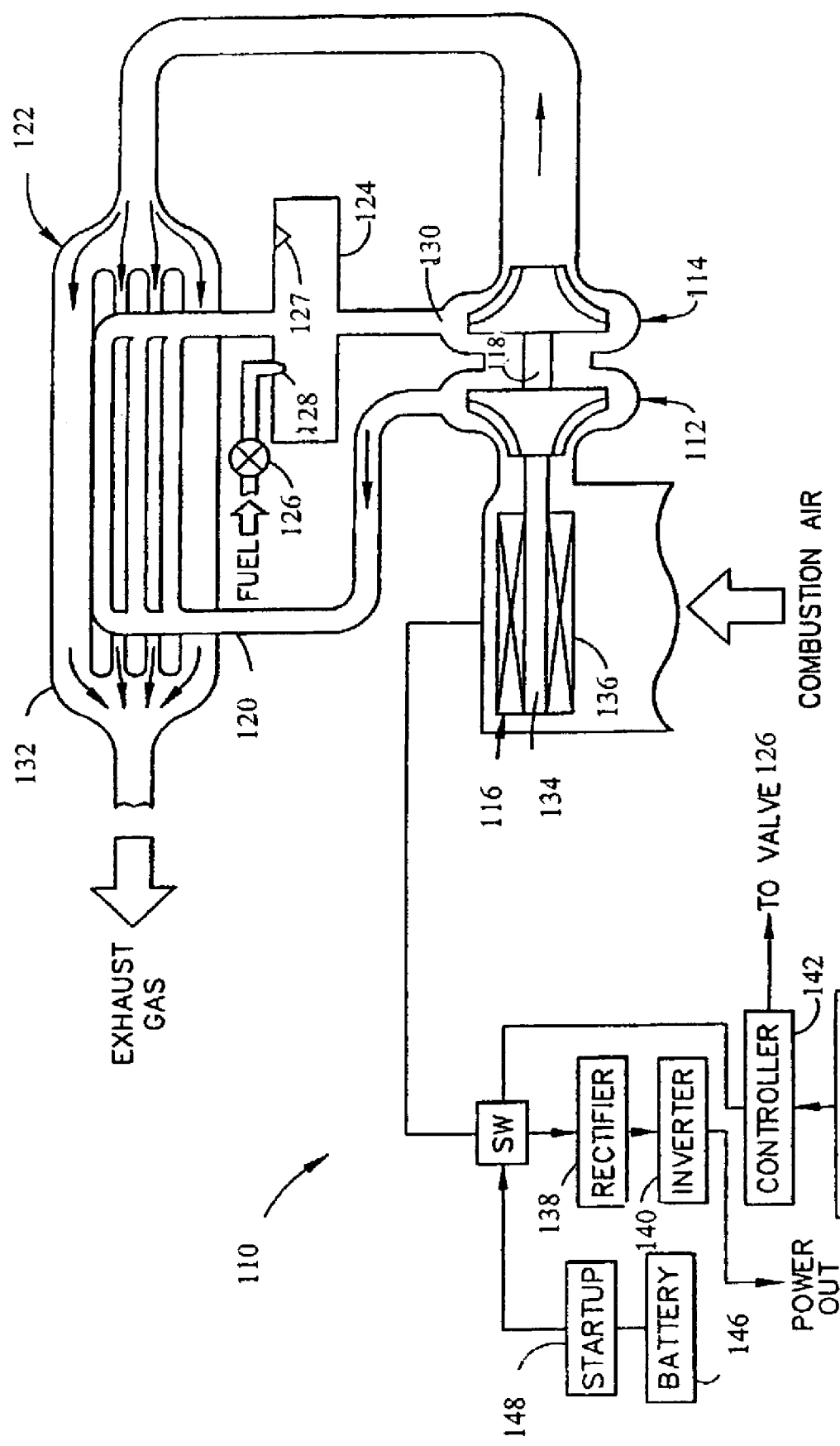
FIG. 1 is a block diagram illustrating certain components of an exemplary microturbine generator, which may be used in certain embodiments of the multi-unit power generation system of the present invention.

FIG. 1 is a block diagram illustrating certain components of an exemplary power generator 110. The power generator 110 shown in FIG. 1 is commonly referred to as a microturbine. A microturbine represents one possible power generator that may be used in a multi-unit power generation system according to the present invention. A microturbine 110 useful within an exemplary system of the present invention may be a microturbine sold under the mark "Parallon 75®" by General Electric Corporation of Schenectady, N.Y. Generally described, the "Parallon 75®" microturbine includes a turbine 114, a compressor 112, and a two-pole permanent magnetic generator rotor 134 mounted on a single high-speed shaft 118 via a number of air bearings. The "Parallon 75®" microturbine may generate about 75 kilowatts (75 kW) of electricity. Those skilled in the art will appreciate that other configurations and components for microturbines exist or may be developed. The compressor 112, the turbine 114 and the generator rotor 134 can be rotated by a single shaft 118 as shown, or can be mounted to separate shafts.

Air entering an inlet of the compressor 112 is compressed. Compressed air leaving an outlet of the compressor 112 is circulated through cold side passages 120 in a cold side of a recuperator 122. In the recuperator 122, the compressed air absorbs heat, which enhances combustion. The heated, compressed air leaving the cold side of the recuperator 122 is supplied to a combustor 24.

Fuel is also supplied to the combustor 124. Both gaseous and liquid fuels can be used. In gaseous fuel mode, any suitable gaseous fuel can be used. Choices of fuel include diesel, flare gas, off gas, gasoline, naphtha, propane, JP-8, methane, natural gas and other man-made gases. The flow of fuel is controlled by a flow control valve 126. The fuel is injected into the combustor 124 by an injection nozzle 128.

Inside the combustor 124 the fuel and compressed air are mixed and ignited by an igniter 127 in an exothermic reaction. The combustor 124 may contain a suitable catalyst capable of combusting the compressed, high temperature, fuel-air mixture at the process conditions. Some known catalysts usable in the combustor 124 include platinum, palladium, as well as metal oxide catalyst with active nickel and cobalt elements.

After combustion, hot, expanding gases resulting from the combustion are directed to an inlet nozzle 130 of the turbine 114. The inlet nozzle 130 has a fixed geometry. The hot, expanding gases resulting from the combustion are expanded through the turbine 114, thereby creating turbine power. The turbine power, in turn, drives the compressor 112 and the electrical generator 116.

Turbine exhaust gas is circulated by hot side passages 132 in a hot side of the recuperator 122. Inside the recuperator 122, heat from the turbine exhaust gas on the hot side is transferred to the compressed air on the cold side. In this manner, some heat of combustion is recuperated and used to raise the temperature of the compressed air en route to the combustor 124. After surrendering part of its heat, the gas exits the recuperator 122. Additional heat recovery stages could be added onto the microturbine 110.

The generator 116 can be, for example, a ring-wound, two-pole toothless (TPTL) brushless permanent magnet machine having a permanent magnet rotor 134 and stator windings 136. The turbine power generated by the rotating turbine 114 is used to rotate the rotor 134. The rotor 134 is attached to the shaft 118. When the rotor 134 is rotated by the turbine power, an alternating current is induced in the stator windings 136. Speed of the turbine can be varied in accordance with external energy demands placed on the microturbine 110. Variations in the turbine speed will produce a variation in the frequency of the alternating current generated by the electrical generator 116. Regardless of the frequency of the ac power generated by the electrical generator 116, the ac power can be rectified to dc power by a rectifier 138, and then processed by a solid-state electronic inverter 140 to produce ac power having a fixed frequency. Accordingly, when less power is required, the turbine speed can be reduced without affecting the frequency of the ac output.

Moreover, reducing the turbine speed reduces the airflow because the compressor runs slower. Consequently, the turbine inlet temperature remains essentially constant, thus maintaining a high efficiency at partial load. Use of the rectifier 138 and the inverter 140 allows for wide flexibility in determining the electric utility service to be provided by the microturbine 110 of the present invention. Because any inverter 140 can be selected, frequency of the ac power can be selected by the consumer. If there is a direct use for ac power at wild frequencies, the rectifier 138 and inverter 140 can be eliminated.

The microturbine 110 also can include one or more batteries 146 for providing additional storage and backup power. When used in combination with the inverter 140, the combination can provide uninterruptible power for hours after generator failure. Additionally, the controller 142 causes the battery 146 to supply a load when a load increase is demanded. The battery 146 can be sized to handle peak load demand on the microturbine 110.

During operation of the microturbine 110, heat is generated in the electrical generator 116 due to inefficiencies in generator design. In order to extend the life of the electrical generator 116, as well as to capture useful heat, compressor inlet air flows over the generator 116 and absorbs excess heat from the generator 116. The rectifier 138 and the inverter 140 also can be placed in the air stream. After the air has absorbed heat from the aforementioned sources, it is compressed in the compressor 112 and further pre-heated in the recuperator 122.

The controller 142 controls the turbine speed by controlling the amount of fuel flowing to the combustor 124. The controller 142 may use sensor signals generated by a sensor group 144 to determine the external demands upon the microturbine 110. The sensor group 144 could include sensors such as position sensors, turbine speed sensors and various temperature and pressure sensors for measuring operating temperatures and pressures in the microturbine 110.

A switch/starter control 148 can be provided off-skid to start the microturbine 110. Rotation of the compressor 112 can be started by using the generator 116 as a motor. During startup, the switch/starter control 48 supplies an excitation current to the stator windings 136 of the electrical generator 116. Startup power is supplied by the battery 146. The controller 142 allows the system to start-up with a single black-start battery 146, using an algorithm or algorithms based on system efficiency and load requirement to control the number of microturbines 110 running and the power output therefrom. In the alternative, a compressed air device could be used to motor the microturbine 110.

Figure 2:
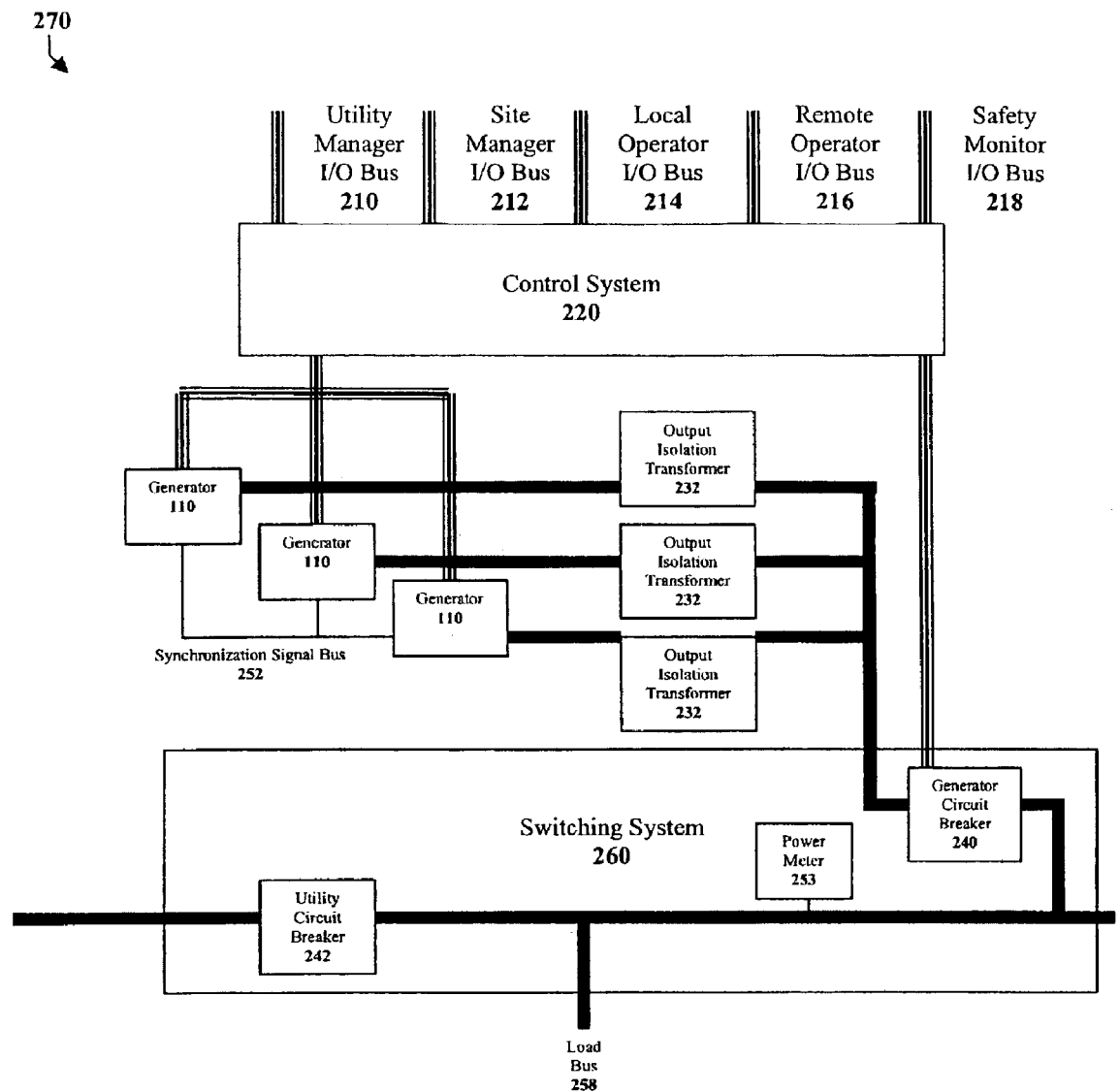
FIG. 2 is a block diagram illustrating a multi-unit power generation system according to exemplary embodiments of the present invention.

FIG. 2 is a block diagram illustrating a multi-unit power generation system 270 in accordance with certain embodiments of the present invention. As shown, the multi-unit power generation system 270 includes multiple generators 110 connected in parallel, a control system 220 and a switching system 260. The generators 110 and the switching system 260 are controlled by the control system 220. All communications to the generators 110 originate from the control system 220. The control system 220 receives information regarding circuit breaker positions, current and voltage from the switching system 260 for both the utility grid and site load.

The control system 220 may include a processor or other logic circuitry for executing system control algorithms and operating system software. The control system may also include memory, such as Flash memory, RAM, and non-volatile memory for storing software modules, computational variables, fault information, installation specific information and user programmable information. The control system 220 is configured to generate commands that are received and processed by the controllers 142 of the individual generators 110.

The multi-unit power generation system 270 may include two or more generators 110. The number of generator 110 in the system may be limited by the physical limitations of the switching system 260 and/or cost efficiency. In other words, the cost of supplying a certain number of generators 110 to meet a certain power demand may exceed the cost of obtaining all needed power from the utility grid. The output from each generator 110 is supplied to an output isolation transformer 232. The output isolation transformers 232 convert generator output voltage to the site operating voltage. The output isolation transformers 232 also isolate and protect the generators 110 from high voltage, maintaining low voltage at microturbine interfaces. Thus, it is preferred that one isolation transformer 232 be provided per each generator 110. A distribution panel 233 may be used to connect the output of the isolation transformers 232 to the switching system 260.

The switching system 260 is connected to the combined output of the multiple generators 110 (e.g., through a distribution panel 233) and to the utility grid. The switching system 260 includes a utility circuit breaker 242 and a generator circuit breaker 240, which are used to transfer the load between the utility grid and the multiple generators 110. A power meter 262 may be incorporated into the switching system 260 in order to monitor the power output of the multiple generators 110. Current, power and voltage sensors (e.g., transformers) may also be contained within the switching system 260 to measure load and grid conditions.

In addition to receiving feedback signals from the switching system 260, the control system 220 may also be configured to receive input signals from various other devices and interfaces. As an example, a local operator I/O bus 214 may be provided for interfacing with local input/output devices and controls. As another example, a remote operator I/O bus 216 may be provided for interfacing with remote input/output devices and controls located anywhere in the world. Remote input/output devices and controls may communicate with the remote operator I/O bus 216 via dedicated or shared communication links. The control system 220 analyzes input signals coming from local and remote locations and makes decisions concerning the operation of the generators 110 based on how the provided information impacts the operating and fault mode strategies programmed into the controller 142.

Other examples of I/O buses that may be provided include a utility manager I/O bus 210, a site manager I/O bus 212, and a safety monitor I/O bus 218. The utility manager I/O bus 210 may be provided, for example, to allow input of an enabling signal for the coordination with utility interfaces. The control system 220 may interpret such an enabling signal such that unless the signal indicates the grid to be in an enabled state, the multi-unit power generation system 270 will not be connected to the grid or if connected will be immediately disconnected from the grid. The site manager I/O bus 212, for example, may provide for input of a signal that controls the starting and stopping of the multi-unit power generation system 270. The safety monitor I/O bus 218 may be provided for input of one or more alarm signals. In certain embodiments, the control system 220 may be configured to respond to alarm input signals, such as a fire alarm signal that may be processed by the control system 220 as an emergency power off situation, a gas detection signal that may be processed as a normal shutdown situation, and a site entry signal that may be processed as a warning situation.

For stand alone operations, the control system 220 designates one of the generators 110 as a master and the other generators 110 as slaves. The control system 220 facilitates start-up of the master generator 110 with the generator circuit breaker 240 being open. Start-up of the slave generators 110 may be staggered so as to reduce total run time on individual units and to reduce the total start-up power requirements and fuel consumption of the multi-unit power generation system 270. The control system 220 starts sufficient generators 110 to support a preprogrammed load level. The master generator 110 produces a synchronization signal that is transmitted to the slave generators 110 via a synchronization signal bus 252. The slave generators 110 synchronize to the frequency indicated by the synchronization signal. In this manner, all operational generators 110 share the load equally. Even if a power failures occur in the master generator 110, the master generator 110 continues to transmit synchronization signals to all operational slave generators 110. Any failed generators 110 will be logged as a fault to the control system 220 and will be bypassed during the next start sequence. Generator failures will also alert operators that the failed generators 110 require maintenance.

Once all the generators 110 are running and ready for load, the control system 220 commands the switching system 260 to close the generator circuit breaker 240. When the generator circuit breaker 240 is closed, the generators 110 assume the load with each machine sharing the load equally. The output of the multi-unit power generation system 270 follows the site demand. However, the site demand cannot require power in excess of the preprogrammed load level, even for startup inrush. If additional generators 110 are available for the site, they may be started-up automatically via sensors in the control system 220 as the total output approaches the capability of the operating generators 110. This process will implement a "spinning reserve" capability. If the load demand exceeds the preprogrammed load level, the multi-unit power generation system 270 will shut down.

In a grid-connected mode of operation, the control system 220 will synchronize the generators 110 with the grid frequency and phase before power is delivered from the generators 110. In grid-connected mode, the control system 220 may control the multi-unit power generation system 270 to provide a programmed load level or peak shaving load levels. In grid-connected mode the generators 110 are loaded in sequence until each reaches its maximum power level. If the desired power level is greater than the total power output capability of the multi-unit power generation system 270, the system will deliver the maximum power possible.

The control system 220 may be configured to provide automatic transition between grid-connected mode and stand-alone mode for the multi-unit power generation system 270. The automatic transition feature may be used to provide back-up power for a facility when the generators 110 are running in grid-connected mode and a loss of grid or grid fault occurs. When the control system 220 senses a grid fault, it commands the switching system 260 to open the utility circuit breaker 242 and the generator circuit beaker 240 and commands all the generators 110 that are running to shift to stand-alone mode and all generators 110 that are not running to start in stand-alone mode. Once all the generators 110 are on and are ready for load, the control system 220 commands the switching system 260 to close the generator circuit breaker 240. When the grid returns and remains stable for a predetermined time interval, the control system 220 commands the switching system to open the generator circuit breaker 240 and close the utility circuit breaker 242.

Based on the foregoing, it will be appreciated that the present invention relates to a multi-unit power generation system that includes multiple generators working in parallel to provide stand-alone and/or grid-connected power for facilities of all sizes. Various methods for implementing such a multi-unit power generation system in accordance with the present invention have been described herein by way of example only. Many other modifications, features, embodiments and operating environments of the present invention were described above by way of example only and are, therefore, not intended as required or essential elements of the invention. It should be understood, therefore, that the foregoing relates only to certain embodiments of the invention, and that numerous changes may be made therein without departing from the spirit and scope of the invention as defined by the following claims.

The invention claimed is:

1. A multi-unit power generation system comprising:
    a plurality of generators, each generator connected in parallel, wherein at least one generator comprises a microturbine generator connected to a corresponding output isolation transformer to convert a generator output voltage to a site operating voltage;

a switching system for switching between and/or aggregating a generator load produced by the plurality of generators and a utility grid load; and a control system in communication with each said generator for communicating command signals to each said generator and in communication with said switching system for commanding the switching system to switch between or aggregate the generator load and the utility grid load, wherein the control system designates a first generator as a master generator and all other generators as slave generators, and wherein the master generator produces and transmits a synchronization signal indicating an operating frequency to the slave generators, and wherein during power failure in the master generator, the master generator continues to communicate a synchronization signal indicating said frequency to the slave generators.

2. The system of claim 1, wherein each generator comprises a microturbine generator.

3. The system of claim 1, wherein the switching system includes a power meter to monitor the generator load; and
   wherein a feedback signal is provided by the switching system to the control system to inform the control system of the generator load.

4. The system of claim 1, wherein the switching system contains means for measuring load conditions and utility grid conditions; and
   wherein feedback signals are provided by the switching system to the control system to inform the control system of the load conditions and utility grid conditions.

5. The system of claim 1, wherein the switching system comprises a utility circuit breaker and a generator circuit breaker;
   wherein the switching system communicates position information for the utility circuit breaker and the generator circuit breaker to the control system; and
   wherein the control system commands the switching system to open and close the utility circuit breaker and the generator circuit breaker in order to switch between or aggregate the generator load and the utility grid load.

6. The system of claim 1, wherein the control system further receives input signals from an input device for allowing an operator to control the generator load.

7. The system of claim 1, wherein the control system controls the generators to provide programmable scheduled start/stop times, load profiles, load following offset and peak shaving power levels.

8. The system of claim 1,
   wherein the control system commands the master generator to operate at a particular frequency.

9. A method for operating a multi-unit power generation system comprising:
   connecting a plurality of generators in parallel;
   connecting a generator load produced by the plurality of generators to a switching system configured for switching between and/or aggregating the generator load and a utility grid load;
   connecting at least one generator to a corresponding output isolation transformer to convert a generator output voltage to a site operating voltage, wherein the at least one generator comprises a microturbine generator; and
   providing a control system configured for communicating command signals to each said generator and for communicating with said switching system for commanding the switching system to switch between or aggregate the generator load and the utility grid load;
   configuring the control system to designate a first generator as a master generator and all other generators as slave generators; and
   configuring the master generator to produce and transmit a synchronization signal indicating an operating frequency to the slave generators, and wherein during power failure of the master generator, the master generator continues to communicate a synchronization signal indicating said frequency to the slave generators.

10. The method of claim 9, wherein connecting a plurality of generators in parallel comprises connecting a plurality of microturbine generators in parallel.

11. The method of claim 9, further comprising the steps of:
    providing a power meter within the switching system to monitor the generator load; and
    configuring the switching system to provide a feedback signal to the control system to inform the control system of the generator load.

12. The method of claim 9, further comprising the steps of:
    providing the switching system with means for measuring load conditions and utility grid conditions; and
    configuring the switching system to provide feedback signals to the control system to inform the control system of the load conditions and utility grid conditions.

13. The method of claim 9, wherein the switching system comprises a utility circuit breaker and a generator circuit breaker;
    wherein the switching system communicates position information for the utility circuit breaker and the generator circuit breaker to the control system; and
    wherein the control system commands the switching system to open and close the utility circuit breaker and the generator circuit breaker in order to switch between or aggregate the generator load and the utility grid load.

14. The method of claim 9, further comprising the step of providing input signals to the control system from an input device for allowing an operator to control the generator load.

15. The method of claim 9, further comprising the steps of:
    configuring the control system to
    command the master generator to operate at a particular frequency.

* * * * *